United States Patent
Calder et al.

(10) Patent No.: US 9,465,602 B2
(45) Date of Patent: Oct. 11, 2016

(54) MAINTAINING SERVICE PERFORMANCE DURING A CLOUD UPGRADE

(71) Applicant: MICROSOFT TECHNOLOGY LICENSING, LLC., Redmond, WA (US)

(72) Inventors: Bradley Gene Calder, Bellevue, WA (US); Samuel James McKelvie, Seattle, WA (US); Aaron W. Ogus, Redmond, WA (US); Arlid E. Skjolsvold, Redmond, WA (US); Hakon Gabriel Verespej, Issaquah, WA (US); Ju Wang, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 125 days.

(21) Appl. No.: 14/064,384

(22) Filed: Oct. 28, 2013

(65) Prior Publication Data
US 2014/0059533 A1 Feb. 27, 2014

Related U.S. Application Data

(63) Continuation of application No. 12/605,767, filed on Oct. 26, 2009, now Pat. No. 8,589,535.

(51) Int. Cl.
| G06F 15/16 | (2006.01) |
| G06F 15/173 | (2006.01) |
| G06F 9/445 | (2006.01) |
| H04L 12/24 | (2006.01) |

(52) U.S. Cl.
CPC ............... *G06F 8/65* (2013.01); *H04L 41/082* (2013.01); *H04L 41/5041* (2013.01)

(58) Field of Classification Search
CPC ..... H04L 29/06; H04L 69/329; H04L 67/02; H04L 63/102; G06F 8/65
See application file for complete search history.

(56) References Cited

U.S. PATENT DOCUMENTS

| 7,739,677 | B1 * | 6/2010 | Kekre et al. | 717/168 |
| 7,788,521 | B1 * | 8/2010 | Sim-Tang | 714/4.12 |
| 2009/0144720 | A1 * | 6/2009 | Roush et al. | 717/171 |
| 2010/0162226 | A1 * | 6/2010 | Borissov et al. | 717/173 |
| 2010/0242037 | A1 * | 9/2010 | Xie et al. | 717/178 |

* cited by examiner

*Primary Examiner* — Peling Shaw
(74) *Attorney, Agent, or Firm* — Bryan Webster; Kate Drakos; Micky Minhas

(57) ABSTRACT

Systems, methods, and computer storage media for upgrading a domain in a distributed computing environment are provided. Upgrading of the domain includes preparing for the upgrade, upgrading, and finalizing the upgrade. The preparation of the domain includes ensuring predefined quantities of role instances are available in domains other than the upgrade domain. The preparation also includes ensuring that a predefined number of extent replicas are available in domains other than the upgrade domain. The preparation may also include checkpointing partitions within the upgrade domain to facilitate faster loading once transferred to a domain other than the upgrade domain. The finalization may include allowing nodes within the upgrade domain to resume functionality that was suspended during the upgrade.

20 Claims, 7 Drawing Sheets

US 9,465,602 B2

MAINTAINING SERVICE PERFORMANCE DURING A CLOUD UPGRADE

CROSS-REFERENCE TO RELATED APPLICATIONS

This application is a Continuation from currently pending U.S. application Ser. No. 12/605,767, filed on Oct. 26, 2009, and similarly entitled MAINTAINING SERVICE PERFORMANCE DURING A CLOUD UPGRADE, the entirety of which is incorporated by reference herein.

BACKGROUND

Typically, when a service in a distributed computing environment is upgraded, nodes operating the service are taken offline to facilitate the upgrade process. When a node is taken offline, the data and services that are associated with the node may be unavailable to clients of the distributed computing environment. During the upgrade of a node, the distributed computing environment traditionally compensates for the offline node as if a failure of the node occurred.

SUMMARY

Embodiments of the present invention relate to systems, methods and computer storage media for upgrading a domain in a distributed computing environment. Upgrading of the domain may include preparing for the upgrade, upgrading, and finalizing the upgrade. The preparation of the domain includes ensuring predefined quantities of role instances are available in domains other than the upgrade domain. The preparation also includes ensuring that a predefined number of extent replicas are available in domains other than the upgrade domain. The preparation may also include checkpointing partitions within the upgrade domain to facilitate faster loading of the partition once transferred to a domain other than the upgrade domain. The finalization may include allowing nodes within the upgrade domain to resume functionality suspended during the upgrade.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein.

DETAILED DESCRIPTION

Figure 1:
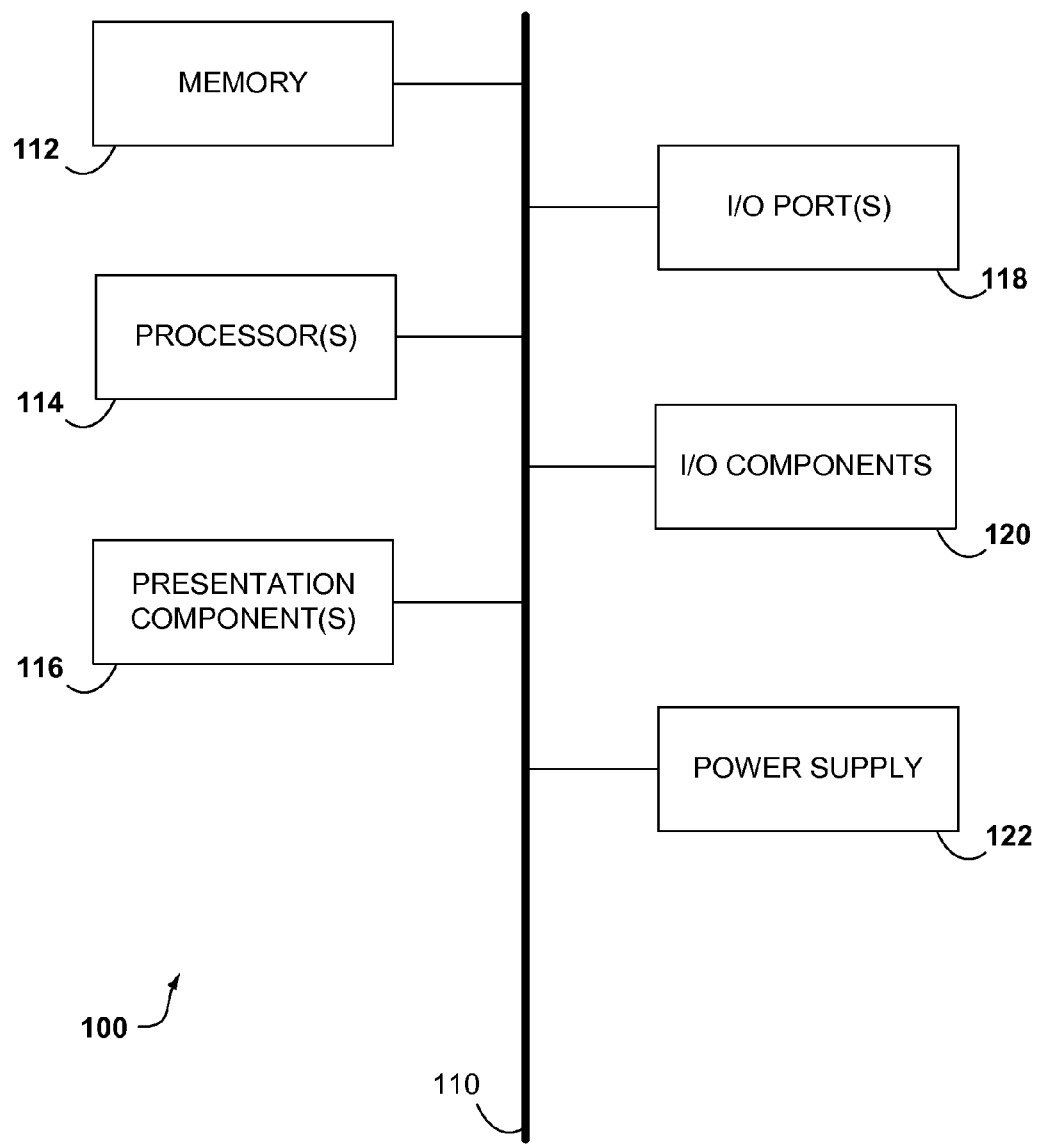
FIG. 1 depicts an exemplary computing device suitable for implementing embodiments of the present invention.

The subject matter of embodiments of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies.

Embodiments of the present invention relate to methods and computer storage media for upgrading a domain in a distributed computing environment. A domain is a set of nodes from a cluster of nodes. The cluster of nodes may be divided up into "N" different domain. Upgrading of the domain includes preparing for the upgrade, upgrading, and finalizing the upgrade. The preparation of the domain includes ensuring predefined quantities of role instances are available in domains other than the upgrade domain. The preparation also includes ensuring that a predefined number of extent replicas are available in domains other than the upgrade domain. The preparation may also include checkpointing partitions within the upgrade domain to facilitate faster loading once transferred to a domain other than the upgrade domain. The finalization may include allowing nodes within the upgrade domain to resume functionality that may have been suspended during the upgrade.

Accordingly, in one aspect, the present invention provides computer storage media having computer-executable instructions embodied thereon, that when executed by a computing system having a processor and memory, cause the computing system to perform a method for upgrading a service in a distributed computing environment. The method includes selecting an upgrade domain within the distributed computing environment in which to upgrade the service. Further, the method includes offloading data, in anticipation of the upgrade, from a node within the upgrade domain to one or more nodes in a domain other than the upgrade domain. The method also includes notifying the distributed computing environment that the upgrade domain is unavailable as a result of being upgraded. The method also includes upgrading the service in the upgrade domain. Upgrading may include updating BIOS settings, an operating system, a service software, service software settings, security information for an operating system, and security information for a service software. The method additionally includes loading the data to the node. The method further includes notifying the distributed computing environment that the upgrade domain is available.

In another aspect, the present invention provides a computer-implemented method for upgrading a service in a distributed computing environment. The method includes preparing an upgrade domain of the distributed computing environment for an upgrade. The preparing includes identifying a role operating in the upgrade domain. Further the preparing includes determining an available quantity of instances of the role in domains other than the upgrade domain is above a predefined threshold. Additionally, the preparing includes checkpointing a partition in the upgrade domain. Further, the preparing includes transferring an assignment for the partition to a domain other than the upgrade domain. The preparing also includes identifying an extent in the upgrade domain. The preparing also includes determining an available quantity of replicas of the extent in domains other than the upgrade domain is above a predefined threshold. The method includes upgrading the upgrade domain with the upgrade.

A third aspect of the present invention provides a method for upgrading a service in a distributed computing environment. The method includes preparing an upgrade domain that is comprised of a plurality of servers of the distributed computing environment for an upgrade. The preparing includes determining a number of instances of a role in one or more domains other than the upgrade domain are above a predefined threshold. The role is responsible for at least some functionality associated with the service. The preparing also includes checkpointing, to facilitate faster loading upon transfer, a partition served from a partition server in the upgrade domain. The preparing additionally includes transferring an assignment to the partition to a domain other than the upgrade domain. The preparing also includes determining a number of replicas of an extent in one or more domains other than the upgrade domain are above a predefined threshold. The preparing additionally includes preventing a new extent instance from being created in the upgrade domain. Further, preparing includes notifying the distributed computing environment that extents are unavailable from the upgrade domain. The method includes upgrading the upgrade domain with the upgrade. The method also includes finalizing the upgrade in the upgrade domain. Finalizing includes authorizing the partition server to serve one or more partitions. Finalizing also includes allowing a new extent instance to be created in the upgrade domain. Finalizing additionally includes notifying the distributed computing environment that one or more extent instances are available from the upgrade domain.

Having briefly described an overview of embodiments of the present invention, an exemplary operating environment suitable for implementing embodiments hereof is described below.

Referring to the drawings in general, and initially to FIG. 1 in particular, an exemplary operating system suitable for implementing embodiments of the present invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of modules/components illustrated.

Embodiments may be described in the general context of computer code or machine-useable instructions, including computer-executable instructions such as program modules, being executed by a computer or other machine, such as a personal data assistant or other handheld device. Generally, program modules including routines, programs, objects, modules, data structures, and the like, refer to code that performs particular tasks or implements particular abstract data types. Embodiments may be practiced in a variety of system configurations, including hand-held devices, consumer electronics, general-purpose computers, specialty computing devices, etc. Embodiments may also be practiced in distributed computing environments where tasks are performed by remote-processing devices that are linked through a communications network.

With continued reference to FIG. 1, computing device 100 includes a bus 110 that directly or indirectly couples the following devices: memory 112, one or more processors 114, one or more presentation component 116, input/output (I/O) ports 118, I/O components 120, and an illustrative power supply 122. Bus 110 represents what may be one or more busses (such as an address bus, data bus, or combination thereof). Although the various blocks of FIG. 1 are shown with lines for the sake of clarity, in reality, delineating various modules is not so clear, and metaphorically, the lines would more accurately be grey and fuzzy. For example, one may consider a presentation module such as a display device to be an I/O module. Also, processors have memory. The inventors hereof recognize that such is the nature of the art, and reiterate that the diagram of FIG. 1 is merely illustrative of an exemplary computing device that can be used in connection with one or more embodiments. Distinction is not made between such categories as "workstation," "server," "laptop," "hand-held device," etc., as all are contemplated within the scope of FIG. 1 and reference to "computer" or "computing device."

Computing device 100 typically includes a variety of computer-readable media. By way of example, and not limitation, computer-readable media may comprise Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices, or any other medium that can be used to encode desired information and be accessed by computing device 100.

Memory 112 includes computer-storage media in the form of volatile and/or nonvolatile memory. The memory may be removable, non-removable, or a combination thereof. Exemplary hardware devices include solid-state memory, hard drives, optical-disc drives, etc. Computing device 100 includes one or more processors that read data from various entities such as memory 112 or I/O components 120. Presentation module(s) 116 present data indications to a user or other device. Exemplary presentation modules include a display device, speaker, printing module, vibrating module, and the like. I/O ports 118 allow computing device 100 to be logically coupled to other devices including I/O components 120, some of which may be built in. Illustrative modules include a microphone, joystick, game pad, satellite dish, scanner, printer, wireless device, and the like.

Figure 2:
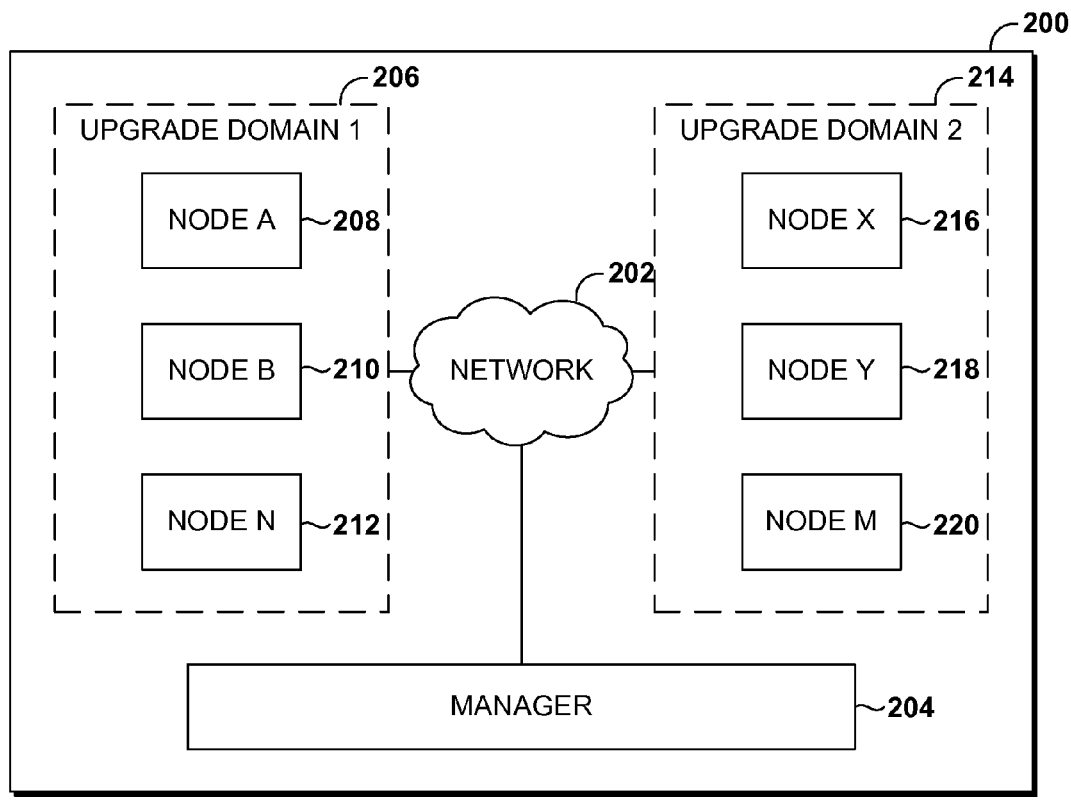
FIG. 2 depicts an exemplary distributed computing environment in which embodiments of the present invention may be employed.

With reference to FIG. 2, a block diagram is provided illustrating an exemplary distributed computing system 200 in which embodiments of the present invention may be employed. It should be understood that this and other arrangements described herein are set forth only as examples. Other arrangements and elements (e.g., machines, components, computer, networks, interfaces, functions, orders, and grouping of functions, etc.) can be used in addition to or instead of those shown, and some elements may be omitted altogether. Further many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

Among other components not shown, the system 200 may include a network 202, a manager 204, an upgrade domain 1 206, and an upgrade domain 2 214. The upgrade domain 1 206 may include a node A 208, a node B 210, and a node N 212. The upgrade domain 2, 214 may include a node X 216, a node Y 218, and a node M 220. Each of the components shown in FIG. 2 may be any type of computing device, such as computing device 100 described with reference to FIG. 1, for example.

The components/nodes may communicate with each other via the network 202, which may include, without limitation, one or more local area networks (LANs) and/or wide area networks (WANs). Such networking environments are commonplace in offices, enterprise-wide computer networks, intranets, distributed computing networks, and the Internet. It should be understood that any number of nodes, fabric managers, upgrade domains, and networks may be employed within the system 200 while staying within the scope of the present invention. Additionally other components not shown may also be included within the system 200.

A distributed computing environment/system is a computing system that is distributed, scalable, and accessible. Such a system may be referred to as a cloud computing system. Such a system is known to one of ordinary skill in the art and will not be discussed in greater detail herein.

The manager 204 is functional to control one or more aspects associated with upgrading, accessing, or utilizing nodes of the distributed computing environment. For example, the manager 204, in an exemplary embodiment, is responsible for facilitating the upgrading of a domain, such as the upgrade domain 1 206. The manager 204, in an exemplary embodiment, is an operating system for one or more aspects of a distributed computing environment. For example, the manager 204 may serve as a storage operating system that, like other operating systems, is responsible for controlling many core functionalities of a storage system. In this example, a storage system includes a number of nodes that are used to store data in a distributed computing environment. An exemplary manager is discussed hereinafter at FIG. 4.

In an embodiment, the manager 204 allows a service to be specified as a set of different roles, which are software components of the service. A service is able to specify what various roles are used, how many instances (e.g., copies) the service needs to have operating, and what roles are allowed to communicate with one another. A service may also specify a number of domains to deploy the various role instances (e.g., copies of the various software components). The fabric manager, in an exemplary embodiment, is responsible for deploying and maintaining the various role instances across the domains in compliance with the service specification.

The manager 204, among other responsibilities, may be responsible to group one or more nodes into domains. For example, the manager 204 is responsible for grouping the node A 208, the node B 210, and the node N 212 into a common domain, the upgrade domain 1 206. Nodes of a storage system may be grouped into "#" (e.g., 1, 5, 10, 20, and 50) number of domains. The value of "#" affects various metrics associated with upgrading a service in a storage system. For example, the fewer number of domains (i.e., greater number of nodes per domain) in which nodes are placed, the less time that may be required to complete an update of the service across all node (e.g., fewer total upgrade iterations may be required). Conversely, the greater the number of domains (i.e., fewer number of the nodes per domain) the more time may be required to complete an upgrade of a service, but the total number of nodes that are unavailable during the upgrade of any one domain is less. Therefore, in an exemplary embodiment, when only one domain is updated at a particular time (i.e., the upgrade is done in series as opposed to in parallel), the fewer the number "#" domains, the faster the upgrade process across all nodes. But, with the fewer number "#" domains, a greater number of nodes may be unavailable at a given time.

For example, the upgrade domain 1 206 and the upgrade domain 2 214, in an exemplary embodiment, are not upgraded in parallel (e.g., simultaneously). Upgrading of domains in series facilitates maintaining durability and reliability within a distributed computing environment. For example, if an upgrade to a service includes an error that causes failure of one or more functionalities (e.g., roles) of the service, the service may also fail. However, if the domains are upgraded in series, the non-updated domains may continue to function after an upgraded domain fails. As will be discussed in more detail hereinafter at FIG. 6, domains of a distributed computing environment may be classified into different geo-related groups. In this example, domains that are in different clusters that are in different geo-related groups may be upgraded in parallel to one another for reasons to be discussed hereinafter. A geo-related group may be comprised of a number of storage clusters. A storage cluster may be comprised of a number of domains. A domain may be comprised of a number of nodes. Clusters within a common geo-related group have a geo-replication dependency to one another in the geo-related group.

A node is a computing device that provides functionality, such as a server. In an exemplary embodiment, a node is a server having a processor and memory to facilitate the access and storage of data that is used by one or more clients of a distributed computing environment. However, it is contemplated that each node is not a discrete device or physical entity, but instead a common device or physical entity that may include a number of different roles that provide various functionality at multiple layers. Additional examples of nodes will be discussed in greater detail at FIG. 3 hereinafter.

Accordingly, any number of components may be employed to achieve the desired functionality within the scope of embodiments of the present invention. Although the various components of FIG. 2 are shown with lines for the sake of clarity, in reality, delineating various components is not so clear. Further, although some components of FIG. 2 are depicted as single blocks, the depictions are exemplary in nature and in number and are not to be construed as limiting.

Figure 3:
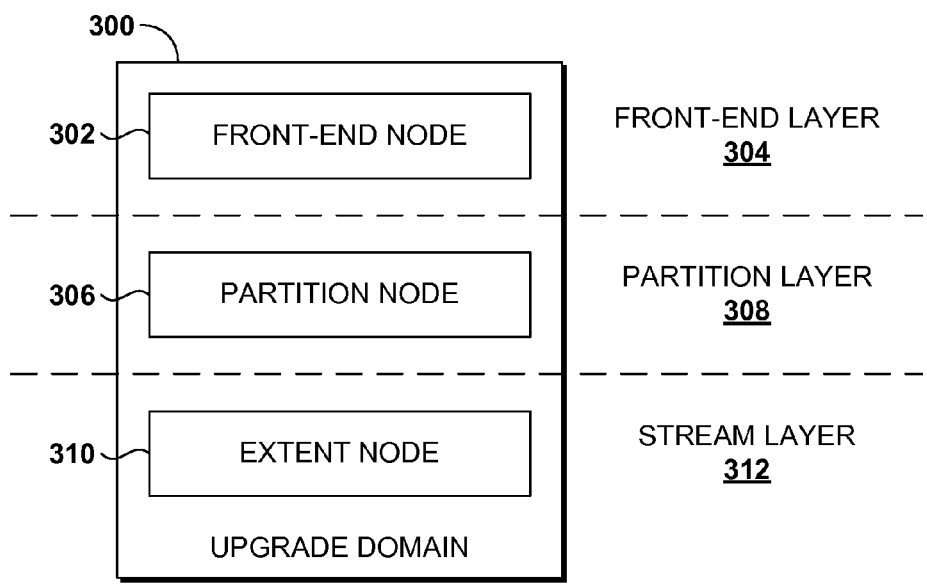
FIG. 3 depicts an exemplary upgrade domain in accordance with embodiments of the present invention.

Turning to FIG. 3, FIG. 3 depicts an exemplary upgrade domain 300 in accordance with embodiments of the present invention. The upgrade domain 300 includes a front-end node 302, a partition node 306, and an extent node 310. An exemplary service is a storage service. Such a service may include three layers for various roles to operate within. For example, FIG. 3 illustrates a front-end layer 304, a partition layer 308, and a stream layer 312.

The front-end layer 304 receives incoming requests for the storage service. Additionally, the front-end layer 304 determines what partition the request references. Data stored in the storage system may be divided into partitions, which are slices of the data as a whole. The front-end layer 304 may then forward the request to an appropriate partition server in the partition layer 308. In an exemplary embodiment, the front-end layer 304 is comprised of front-end nodes, such as the front-end node 302. For example, the front-end node 302 may be a stateless node that serves as a role for the front-end layer 304. A fabric manager may evenly distribute front-end nodes across different domains of a distributed computing environment. In an exemplary embodiment, a distributed computing environment may consist of one to one hundred front-end nodes that are dispersed evenly or as required across all domains by a fabric manager.

The second layer, the partition layer 308, processes requests that have been forwarded by the front-end layer 304. For example, a received request may be processed at the partition layer 308 to a corresponding table, blob, or queue—type partition. In this example, when the request is a write request or a delete request, persistent data is stored in the stream layer 312. However, in this example, when the request is a read request, the request is served from either the memory at the partition layer 308 or read from the stream layer 312.

In an exemplary embodiment, the partition layer 308 is comprised of hundreds of partition nodes, such as the partition node 306. In this example, each partition node serves a set of partitions. Further, in an exemplary embodiment, a fabric manager spreads the partition nodes evenly across the domains. However, it is contemplated that the partition nodes may be dispersed by other methods across the various domains.

Additionally, not shown at FIG. 3, but nonetheless contemplated, the partition layer 308 may also include a partition master role that manages partition servers and partitions of the partition layer 308. In an exemplary embodiment, five to ten partition master roles are provided in a storage system. However, it is contemplated that fewer or additional partition master roles may be implemented to achieve embodiment of the present invention. In an exemplary embodiment each partition manager role is located in a different domain by a fabric manager.

The third layer, the stream layer 312 is a layer that provides replication and persistent storage for data of a storage system. In an exemplary embodiment, data stored in a storage system is stored as streams. Streams, in this example, consist of an ordered list of extents. An extent is a block of data. Therefore, in this example, an ordered list of extents defines a stream. Further, in an exemplary embodiment, each unique extent is replicated at least three times in the distributed computing environment. However, it is contemplated that additional or fewer extent replications are maintained to achieve embodiments of the present invention.

In an exemplary embodiment, the stream layer 312 is comprised of hundreds of extent nodes, such as the extent node 310. In this example, the extent node serves extents in the stream layer 312. The extent nodes are dispersed across the domains by a fabric manager. In an exemplary embodiment, the extent nodes are evenly dispersed across all domains of a storage system. However, it is contemplated that extent nodes are dispersed through other methods (e.g., to satisfy demand). Additionally, in an exemplary embodiment, each of the replicas (i.e., copies) of an extent is located in different domains, which may be accomplished by a stream manager.

Additionally, not shown at FIG. 3, but nonetheless contemplated, the stream layer 312 may also include a stream manager, which is a role that manages stream namespace, extents, and extent nodes in the stream layer 312. In an exemplary embodiment, there are five to ten stream managers role instances for a storage system. However, it is contemplated that fewer or additional stream manager role instances may be implemented to achieve embodiments of the present invention. Additionally, in an exemplary embodiment, a fabric manager is responsible for dispersing each stream manager role instance in a different domain. Additionally, the stream layer 312 may be comprised of a client library. The client library may be utilized to access the stream layer directly. Therefore, extent nodes, stream managers, and client libraries together provide stream functionality.

Figure 4:
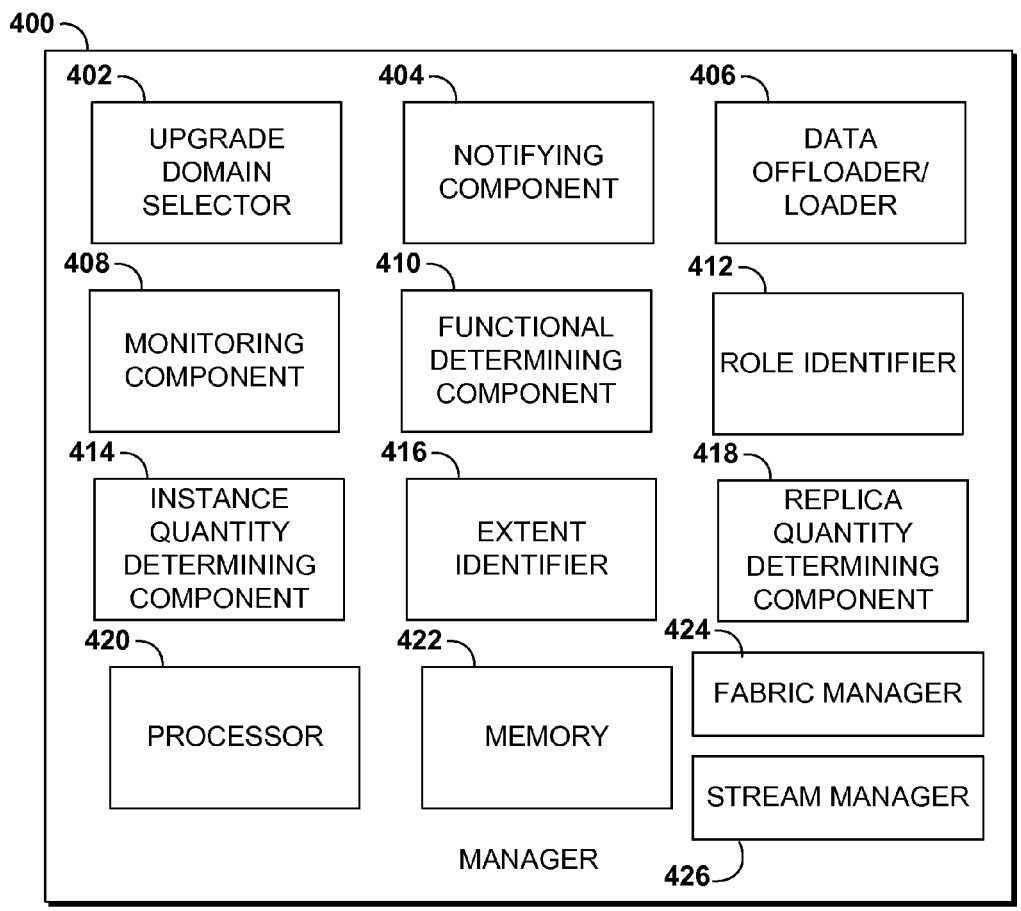
FIG. 4 depicts a manager in accordance with an embodiment of the present invention.

FIG. 4 depicts a manager 400 in accordance with embodiment of the present invention. It is understood that the manager 400, in reality, may instead be a distributed operating system functional to control a distributed computing environment. Therefore, while the manager 400 is discussed herein as a single entity for discussion sake, the manager 400 may instead be more abstract and distributed.

The manager 400 is comprised of components, which include: an upgrade domain selector 402, a notifying component 404, a data offloader/loader 406, a monitoring component 408, a functional determining component 410, a role identifier 412, an instance quantity determining component 414, an extent identifier 416, a replica quantity determining component 418, a processor 420, a memory 422, a fabric manager 424, and a stream manager 426. It is understood that any component of the manager 400 may utilize the processor 420 and/or the memory 422 to achieve one or more functionalities discussed herein. Additionally, it is contemplated that any component may have a unique processor and/or memory that allow the component to specially function to cause a transformation to achieve embodiments of the present invention.

The upgrade domain selector 402 is functional to select a domain from a plurality of domains. A domain is selected, in an exemplary embodiment, to be upgraded. Upgrading of a domain includes upgrading one or more services within the domain. For example, upgrading of a domain may include upgrading a storage service, such as Windows Azure Storage, an exemplary storage service available from the Microsoft Corporation of Redmond, Wash.

When a storage service is upgraded, durability and availability of data are desired. Therefore, reliance on default mechanism that may be inherent to storage system failure recovery is not optimal for an anticipated or planned unavailability within the storage system. For example, a data system may be designed to recover and maintain availability of data when a node fails; however, without preparing the data on the node prior to failure, additional resource and/or additional time may be necessary to access the data of the failed node. Therefore, it is beneficial in an exemplary embodiment to implement embodiments of the present invention to overcome deficiencies of relying on inherent failure recovery methods of a storage system to facilitate upgrading of a node, service, or domain.

In an exemplary embodiment, the upgrade domain selector 402 is functional to identify a domain that is optimal for an initial upgrade. For example, the domain selector 402 may select a domain that is lightly loaded or is utilizing a fewer number of resources. In an exemplary embodiment, selection of an initial domain that has test data may be desired in the event the upgrade is ineffective or causes one or more nodes of the domain to fail or not function properly. By selecting a domain with test data, less non-test (e.g., customer) data may therefore be impacted by the ineffective upgrade. In an exemplary embodiment, the upgrade domain selector 402 is managed, at least in part, by the stream manager 426 when selecting a first domain to be upgraded.

Additionally, in an exemplary embodiment, the upgrade domain selector 402 is functional to identify domains in different geo-related groups. For example, while domains may be serially upgraded within a common geo-related group, domains that are in different geo-related groups from one another may be upgraded in parallel. Therefore, the domain selector 402 may identify domains that may be upgraded in parallel from different geo-related groups. Geo-related groups contain storage services that have data being geo-replicated across the services. This geo-replication creates a dependency between the services; therefore, the services may not be upgraded in parallel to prevent a failure potential during the upgrade.

In an exemplary embodiment, geo-replication within a geo-related group may be paused or temporarily suspended. In this example, the geo-replication may be paused between a first cluster and a second cluster that comprise a common geo-related group. For example, when the first cluster is being upgraded, geo-replication between the first and the second cluster may be paused. This may prevent propagation of an error to the second cluster that occurs during upgrade of the first cluster. Following the upgrade of the first cluster, geo-replication among the first and the second cluster may resume. However, it is contemplated that pausing geo-replication may result in the geo-replication between the first cluster and the second cluster to get behind schedule, which creates a chance of data loss if the first cluster is to fail.

The notifying component 404 is functional to notify one or more devices, clients, services, nodes, or components of information related to a domain. For example, a domain or a portion of the domain may be unavailable as a result of an upgrade being performed. In this example, one or more nodes of a domain may be inaccessible during the process of upgrading the domain; therefore, efficiencies may be realized in embodiment of the present invention if elements of an associated distributed computing environment are notified of the upcoming availability or unavailability of resources. As a result, the notifying component 404 provides notification of available or unavailable resource to various elements of a distributed computing environment in an exemplary embodiment of the present invention.

The data offloader/loader 406 is functional to offload or load data from/to a node. In an exemplary embodiment, the data offloader/loader 406 is functional to request data to be checkpointed and transferred from a node to another node. Checkpointing is a process of repackaging a partition with a modified state for faster loading. For example, when failure of a node that is serving a partition with a modified state occurs, the partition is re-loaded at the previous checkpoint and one or more log files are relied upon to reconstruct the modified state that existed prior to failure of the node. In an exemplary embodiment, checkpointing of the partition allows for the modified state of the partition to be integrated within the partition to reduce the resources required upon restart of a node. It is understood, that checkpointing of data includes requesting a node, device, or component to perform the action of checkpointing. Therefore, the manager 400 including the fabric manager 424 and the stream manager 426, in an embodiment, checkpoints, transfer, and/or offloads data from a node by requesting such an action to be performed by the node or other associated elements.

Additionally, it is contemplated that the data offloader/loader 406 is functional to load data to a domain or associated nodes. For example, following an upgrade of a domain, partitions that were previously offloaded to other domains may be re-loaded to the upgraded domain. This re-loading may be done, in part, to satisfy an affinity of the data or partitions to a particular node or domain. In this example, the data offloader/loader 406 satisfies loading the data. In an exemplary embodiment, a partition master may be referenced to aid in loading data to an affinitized node.

The monitoring component 408 is functional to monitoring a domain and/or nodes. The domain, in an exemplary embodiment, is monitored before, during, and/or after upgrading the domain. The monitoring component 408 may employee any of a number of tests when monitoring a domain. Example of tests that may be used, which will be discussed in greater detail hereinafter, include: a smoke test, an availability test, a performance test, an alert test, an error test, a dump test, a system resource test, and/or a system metadata health test. In general, tests used by the monitoring component 408 may be referred to herein as "health tests" as the tests are generally evaluating the health of a domain, a role, a service, or a node (e.g., health of a storage service). Further, it is contemplated that any combination of tests, including those discussed herein and those similar in concept, may be implemented at various stages of an upgrade to monitor the health of a domain.

The smoke test is a grouping of small tests that are designed to run quickly against parts of a storage system to ensure the system is in a healthy state. The smoke test checks APIs associated with services, components, the fabric, and other software operating in the distributed computing environment to ensure they are operating as intended. Additionally, the smoke tests examine latency and throughputs of operations to ensure those values are at appropriate levels. Additionally, the smoke test verifies that API's, components, software, etc. are available and reachable as intended.

The availability test includes monitoring the availability of a role or a node within a domain. For example, during preparation or during finalization of an upgrade, if availability of the nodes within the domain goes above or below a predefined threshold, the upgrade is suspended. Similar to other metrics associate with the health tests, availability is a metric that may be monitored by a storage manager or a fabric manager regardless of an upgrade being implemented. It is contemplated that monitoring is not limited to an upgrade domain but also extends to other domains. For example, a first domain may be upgraded and the monitoring may indicate the first domain is healthy; however, another domain may be affected as a result of the upgrade to the first domain. Monitoring may therefore be implemented system wide to detect ripple effects caused by an upgrade.

The performance test evaluates the latency and throughput of a domain and/or nodes within the domain. In an exemplary embodiment, the performance test is implemented in conjunction with other tests that define the smoke test. The performance test monitors the latency and throughput, if latency increases above a predefined threshold or throughput drops below a predefined threshold, the upgrade process is suspended or otherwise amended to ensure reliability, durability, and availability of the a distributed computing environment.

The alert test monitors for alerts issued by nodes within a domain. A node may provide an alert that internal errors, conflicts, or other abnormalities have been detected, and as a result, an alert is provided that is detected as part of the alert test.

The dump test monitors if crash dumps that occur within a domain increase above a predefined threshold. Additionally, the error test also monitors the errors reported from a domain, such as from the nodes within a domain. Similar to the crash dumps, if the number of errors increases above a predefined threshold, the upgrade process may be suspended as an indication of trouble with the upgrade.

The system resource test monitors system resource utilization to identify if the utilization increases above a predefined threshold. For example, the system resources may include CPU usage, memory usage, network usage, or the like.

The system metadata health test monitors and verifies that the key system metadata tables (e.g., schema tables, partition tables, and the like), roles (e.g., partition managers and stream managers), and a predefined percentage of particular roles (e.g., front-end servers, partition servers, and extent node roles) are accessible and healthy.

The health tests may, as previously discussed, be implemented independently or in any combination to monitor the health of a domain. Similarly, once a health test indicates a problem, a recent or concurrent upgrade may be suspended from being implemented at other domains. Additionally, an upgrade may be "rolled-back" from a domain to reset the state of the domain to a previous position. For example, the domain may revert to the previous "version" prior to an upgrade of a service on the domain, or stated differently, the domain may be downgraded.

Utilization of the health tests and monitoring the tests allows for automated upgrading of the domains while maintaining availability, durability, and performance. This may be achieved by preventing the propagation of faulty upgrades as identified by one or more health tests. Therefore, services may continually be upgraded in an automated fashion while ensuring that the distributed computing environment is resilient and is able to automatically adjust to detected abnormalities resulting from upgrades.

The functional determining component 410 is able to determine if a domain is functioning within predefined guidelines or satisfies predefined conditions. For example, in conjunction with results from health tests performed by the monitoring component 408, the functional determining component 410 is able to identify when a domain is not functioning properly and therefore alter the progress of an upgrade. In an exemplary embodiment, the functional determining component 410 determines a domain is not operating appropriately and therefore the upgrade on that domain should be rolled-back and additionally, the upgrade should not be propagated to other domains. Further, it is contemplated that previously upgraded domains may also be rolled-back. In an exemplary embodiment, predefined conditions and guidelines are based on metrics associated with one or more health tests that are monitored across the system as a whole. When those metrics are satisfied, a domain is functioning properly, in an exemplary embodiment.

The role identifier 412 is functional to identify a role operating within a domain. As previously discussed, a role is functionality or a component of a service. In an exemplary embodiment, the role identifier 412 is able to identify a role associated with a service to which the upgrade is directed. In an additional exemplary embodiment, the role identifier 412 is functional to identify a plurality of roles operating on a domain that is preparing to be upgraded. In this example, one or more of the plurality of roles may be identified to ensure a proper number of instances are running in domains other than the domain that is to be upgraded. Domains that are other than the upgrade domain may be referred to herein as an "other domain."

The instance quantity determining component 414 is functional to determine a number or quantity of instances of a role operating in an upgrade domain and/or other domains. As will be discussed in more detail later, embodiments of the present invention desire a predefined number or relative percentage of instances to be operating in the other domains. For example, in this scenario, it is assumed that all instances within the upgrade domain will be unavailable. While this may not be true in actuality, for purposes of ensuring availability such a situation is assumed in this embodiment. Therefore, the instance quantity determining component 414 is able to identify a number of instances of an identified role that are operating and/or available in the other domains.

The extent identifier 416 is functional to identify one or more extents stored in a domain. For example, a domain may be comprised of a plurality of extent nodes (e.g., servers) that service a stream layer of a storage service. In this example, to ensure durability, reliability, and availability, it may be desirable to have a predefined number of replicas of an extent distributed across the storage system. The extent identifier 416 is able to identify one or more extents within an upgrade domain to ensure a sufficient quantity of replicas are available in the upgrade domain and/or other domains. In an exemplary embodiment, the extent identifier 416 is managed by and communicated with the stream manager 426 to provide described functionality.

The replica quantity determining component 418 is functional to determine a number of replicas of an identified extent that are available and/or stored within an upgrade domain and/or other domains. For example, a domain may not be upgraded until a predefined number of replicas for each extent located at the upgrade domain are available at other domains. In an exemplary embodiment, a number of replicas may be defined for specific domains to allow an upgrade to continue. As will be discussed later, an upgrade may be suspended or cancelled until the stream layer has replicated the extent in other domains to a sufficient quantity. In an exemplary embodiment, replica quantity determining component 418 is managed by and communicated with the stream manager 426 to provide described functionality.

The processor 420 is a computer processor functional to intake computer-readable instructions to output a transformation. The processor 420, in an embodiment, is similar to the processor(s) 114 of FIG. 1. Similarly, the memory 422 is memory for use in a computing system. The memory, in an embodiment, is similar to the memory 112 of FIG. 1.

The fabric manager 424 is a component functional to manage one or more components of the manager 400 as well as to provide core functionalities. In an exemplary embodiment, the fabric manager 424 manages components to accomplish management of nodes as well as knowing a state of upgrade or other status of the nodes. Further, the fabric manager 424 manages components or provides functionality that are in charge of roles that are processes that make up a service. The fabric manager 424 may control knowing the state of a role, controlling communication among roles, and restarting roles.

The stream manager 426 is a component functional to manage one or more components of the manager 400. For example, the stream manager 426 may be responsible for managing partitions, which may include partition assignments, checkpointing, offloading, and location identification. Further, the stream manager 426 may also be responsible for managing extents, which may include extent instances and replication of extent. Further, the stream manager 426 may be responsible for managing components to identify which extent instances are associated with which extent nodes. For example, the stream manager may be responsible for managing preparation and finalization stages of an upgrade to a domain. In an exemplary embodiment, the stream manager 426 is responsible for managing the selection of the first domain to be updated. In an exemplary embodiment, the stream manager 426 manages the functionality provided by the offloader/loader 406, the instance quantity determining component 414, the extent identifier 416, and the replica quantity determining component 418. Further, in an exemplary embodiment, the stream manager 426 manages authorizing a partition node or upgrade domain to serve a partition. It is contemplated that managers similar to the stream manager 426 may additionally be incorporated with the manager 400 for service other than a storage service.

Accordingly, any number of components may be employed to achieve the desired functionality within the scope of embodiments of the present invention. Although the various components of FIG. 4 are shown with lines for the sake of clarity, in reality, delineating various components is not so clear, and metaphorically, the lines would more accurately be gray or fuzzy. Further, although some components of FIG. 4 are depicted as single blocks, the depictions are exemplary in nature and in number and are not to be construed as limiting.

Figure 5:
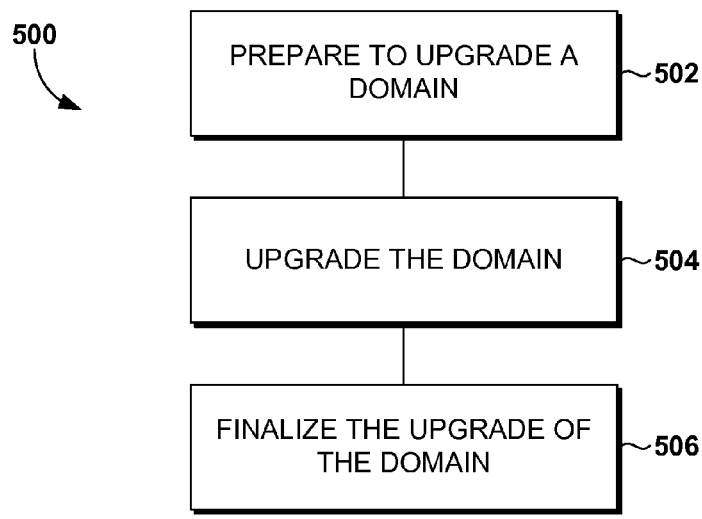
FIG. 5 depicts a high-level method for upgrading a domain in accordance with embodiments of the present invention.

FIG. 5 depicts a high-level method 500 for upgrading a domain in accordance with embodiments of the present invention. In this exemplary embodiment, the method 500 includes preparing to upgrade a domain 502, upgrading the domain 504, and finalizing the upgrade of the domain 506. In this example, the upgrading of a domain is comprised of three steps that help achieve efficiencies in upgrading a domain. To the contrary, if a domain of a distributed computing environment is intended to be upgraded and the domain is taken offline to perform the upgrade, inherent characteristics of a data store may allow the data store to continue to operate. However, an unanticipated failure of the domain, as a result of taking it offline and relying on inherent characteristic, fails to achieve the advantages as discussed herein. For example, when relying on inherent node failure recovery, a sufficient number of role instances may not exist nor are they provided time to be created, partitions may not be checkpointed for faster loading and greater reliability, and a sufficient number of extent instances may not exist nor are they provided an opportunity to be replicated in anticipation of the "failure." These are just a few of the advantages that may be appreciated with embodiments of the present invention.

Figure 6:
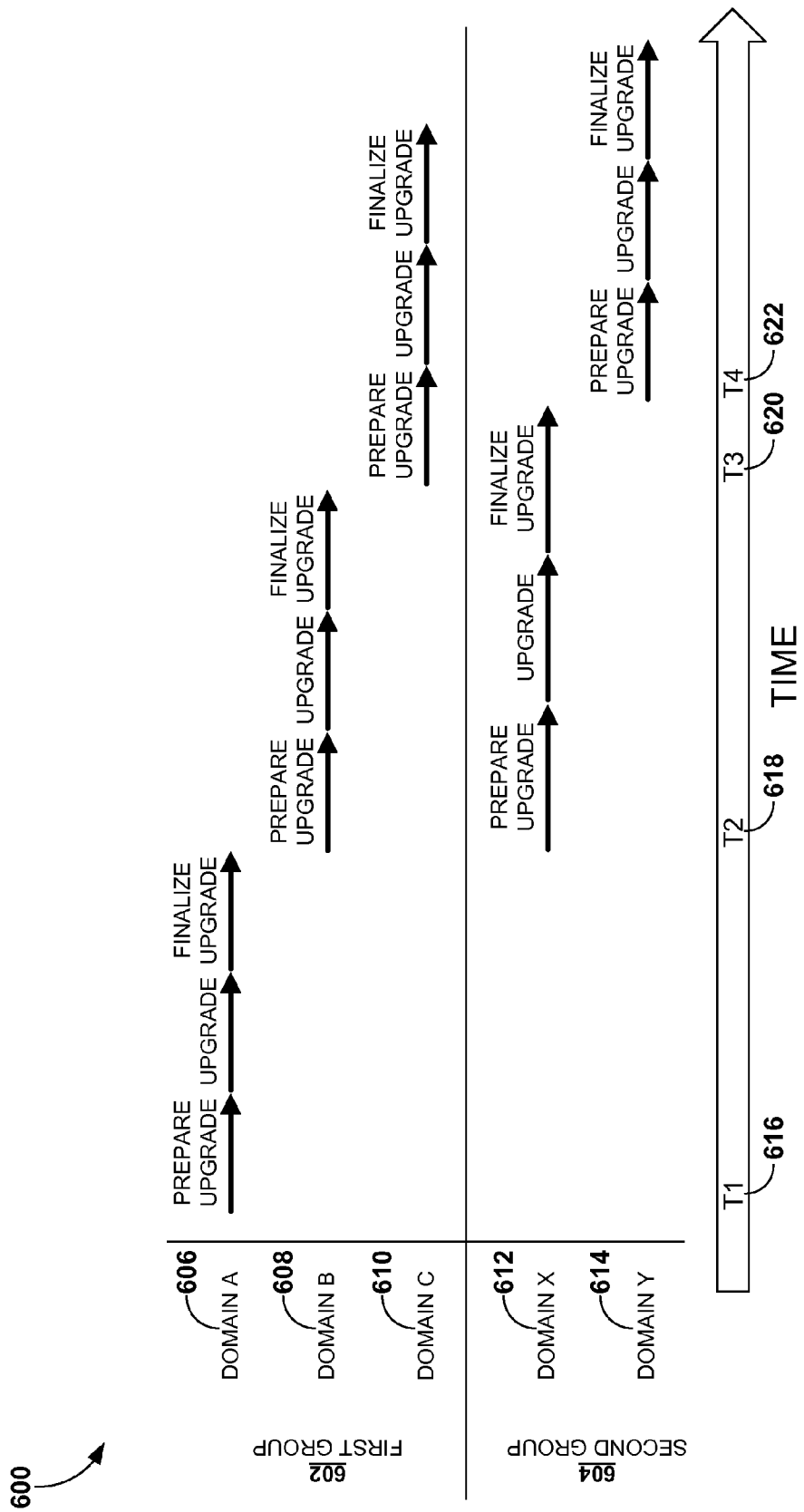
FIG. 6 depicts a diagram illustrating a sequence for upgrading of domains in different groups that are not geo-related in accordance with embodiments of the present invention.

FIG. 6 depicts a diagram 600 illustrating a sequence for upgrading of domains in different geo-related groups in accordance with embodiments of the present invention. A first group 602 and a second group 604, which are not geo-related to one another, are identified. Each of the groups is comprised of a number of domains. For example, the first group 602 includes a cluster that is comprised of a domain A 606, a domain B 608, and a domain C 610. The second group 604 includes a cluster that is comprised of a domain X 612 and a domain Y 614. Additionally, an abstract timeline is depicted that includes a T1 616, a T2 618, a T3 620, and a T4 622.

A geo-related group is a grouping of storage clusters that are grouped due to geo-replication dependencies. For example, a set of geo-related clusters may be comprised of clusters that geo-replicate among each other. In this example, the clusters within a common geo-related group are used to geo-replicate amongst each other. Therefore, in an exemplary embodiment, multiple clusters in different geo-related groups may be upgraded in parallel, but the clusters within a given geo-related group are upgraded in series. In addition embodiments, in a geo-related group, domains for a given cluster are upgraded before upgrading a next cluster within the geo-related group. Clusters are upgraded in series when abstaining from upgrading a subsequent cluster until a prior cluster has finished upgrading. It is understood that any number of geo-related groups may exists. Additionally, it is contemplated that the geo-related groups may include clusters from a variety of geographic locations. Further, it is contemplated that a geo-related group is not limited by a geographic location, but instead, represents a grouping of clusters unified by a characteristic.

In an exemplary embodiment of the present invention, a single geo-related group exists, and therefore, the sequence may only include serial upgrading. However, a number of geo-related groups may exist, which may therefore incorporate parallel upgrading among geo-related group and serial upgrading within each geo-related group.

For example, at T1 616 the domain A 606 is prepared for upgrade. In this example, a domain within the cluster of the second geo-related group 604 may also begin upgrading at T1 616 because parallel upgrading among different geo-related group is feasible. However, in an exemplary embodiment, an initial storage cluster or a subset of domains from that storage cluster is upgraded across all geo-related groups and storage cluster to reduce the spread of issues if the upgrade is unsuccessful. The initial cluster selected may be intelligently selected so that it has wide spread traffic behavior and a minimal impact on non-test data if there is a problem during upgrade. Therefore, the domain A 606 is upgraded initially to ensure the viability of the upgrade. As a result, the domain A 606 is prepared for upgrade, upgraded, and the upgrade is finalized by time T2 618. During the upgrade process (i.e., prepare, upgrade, and finalize) health tests may be performed to monitor the health of the domain A 606. Once the domains A 606 is determined to be functional by T2 618, additional domains may be upgraded.

In FIG. 6, the domains B 608 and the domain X 612 begin the upgrade at time T2 618. Therefore, the domains B 608 and the domain X 612 are upgrading in parallel. However, as depicted in FIG. 6, the domain B 608 is completed with the upgrade at time T3 620, while the domain X 612 is not completed with the upgrade until time T4 622. The time for an upgrade may depend on the number of resource available, the number of instance and extents affected, the amount of data to be checkpointed, and such. FIG. 6 demonstrates that domains within different geo-related groups are not dependent upon one another for advancement of an upgrade. Additionally, FIG. 6 demonstrates that parallel upgrading may be suitable for clusters different geo-related groups and that serial upgrading is suitable within a geo-related group. However, FIG. 6 is not limiting as to the scope of the present invention and is only an illustration of an exemplary embodiment.

Figure 7:
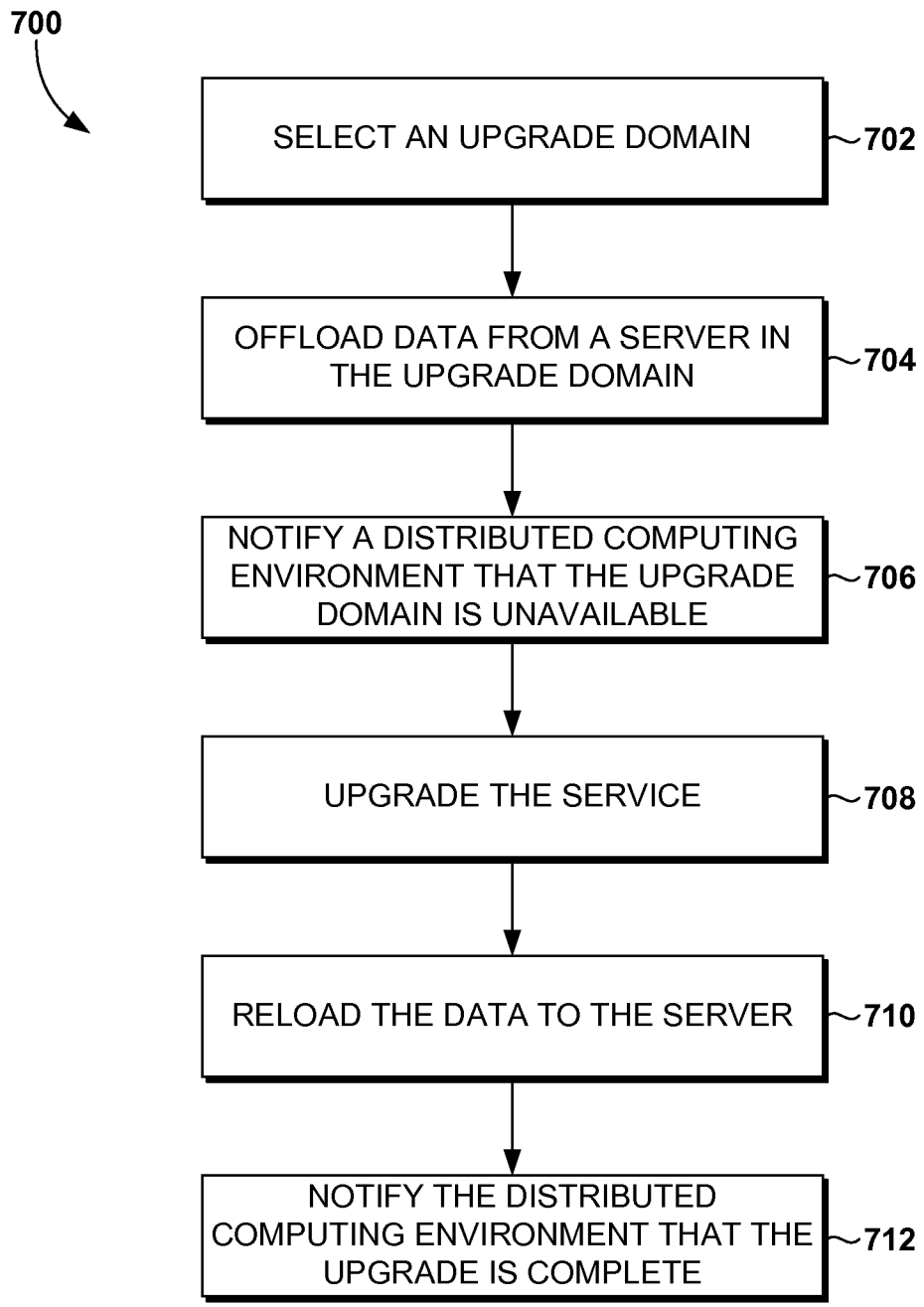
FIG. 7 depicts a method for upgrading a service in a distributed computing environment in accordance with embodiments of the present invention.

FIG. 7 depicts a method 700 for upgrading a service in a distributed computing environment in accordance with embodiments of the present invention. The method 700 includes a step 702. At the step 702 an upgrade domain within a distributed computing environment is selected to be upgraded. In an exemplary embodiment, a domain is upgraded when one or more services that are supported by the domain, at least in part, are upgraded at the domain. Therefore, in this example, when a service that has a role that is accessible in at least one node of a domain is upgraded, the domain is considered to be upgraded. Once a domain has been selected to be upgraded, that domain may be referred to herein as an upgrade domain. An upgrade domain is a domain that includes at least one instance of a role associated with a service that is intended to be upgraded.

The selection of the upgrade domain may be accomplished by a number of methodologies. For example, a random or pseudo random selection may occur. In an additional embodiment, the data type (e.g., test data, non-test data) within the domain may be used to select a domain.

At the step 704, data from a server in the upgrade domain is offloaded in anticipation of an upgrade. Therefore, unlike a random failure of the node, an anticipated upgrade of the node within a domain allows partitions to be checkpointed, which increases efficiencies with reloading the partition. In an exemplary embodiment, the offloading of data includes checkpointing one or more partitions that store the data in various extents. Additionally, in an exemplary embodiment, the offloading of data includes transferring the data to one or more servers in a domain other than the upgrade domain. In this example, the transferred data may therefore be accessible at the other domains while the upgrade domain is being upgraded. This helps ensure availability of the data. Further, checkpointing and transferring of the data from the upgrade domain allows redundancy level of the data to be maintained. If the data was not transferred, as is the case when relying on inherent node failure recovery, the redundancy levels may be compromised for the data. In an additional exemplary embodiment, the offloading of data includes transferring the data in its current state to one or more other domains. Data that is offloaded includes roles, partitions, extents, and/or the like. It is contemplated that the transferring of data may not include copying the data or moving the data. Instead, transferring of data may include re-assigning associated extents to a different domain or node than currently assigned. In an exemplary embodiment, a replication system allows for one instance of an extent to remain in a domain that is being upgraded without requiring replication. However, in this example where one instance that remains on the upgrade domain, may not have attempted accesses (e.g., avoiding reads), which may avoid a timeout associated with the access.

Offloading of data from a domain that is to be upgraded allows a current level of data redundancy within the distributed computing environment to be maintained. For example, a specific number of instances or replicas of roles and extents may be required. If inherent node failure recover techniques are relied upon when upgrading a domain, the data of the upgraded domain may not be available and therefore the level of redundancy of the data is reduced, which may increase the possibility of unavailability or data loss. For this reason, embodiments of the present invention are advantageous over relying on inherent node failure recovery techniques because a current level of redundancy is maintained.

At a step 706, a distributed computing environment is notified that the upgrade domain is unavailable. For example, a fabric manager may notify or be notified that an upgrade domain is anticipated as being unavailable as a result of an upgrade. In this example, the fabric manager may provide notification to one or more clients that utilize partitions, extents, or data in general that they are temporarily unavailable from the upgrade domain. A client, such as a stream client, is an entity or service that requests information or data from a node. Because the client requests and expects to receive a response as a result of the request, a service or entity in that position is referred to as a client.

In an exemplary embodiment, a service operating in the distributed computing environment may request data that is located, at least in part, within an upgrade domain. However, because the fabric has provided a notification that the upgrade domain is unavailable; the request for the data may be directed to a different domain that maintains another replica of the requested information. By diverting the request from the upgrade domain to another viable domain, the system has prevented latency or delays caused by an eventual time-out that would result from the unavailable upgrade domain. Therefore, notification that an upgrade domain is down is advantageous over inherent failure recovery techniques that may merely rely on the request timing out.

At a step 708, the service is upgraded. In an exemplary embodiment, a service is upgraded by a fabric manager that facilitates the upgrading at one or more nodes. Therefore, upgrading the service includes a fabric manager overseeing the operations done at one or more nodes that cause the service to be upgraded. A service, in an exemplary embodiment, is upgraded by updating one or more roles associated with the service. The roles may be stored within the upgrade domain.

At a step 710, the data is loaded to the server. In an exemplary embodiment, the data is loaded to the server from which it was offloaded at the step 704. Additionally, data may have an affinity to a specific domain, node, or even data store. The loading of the data to the server may take into consideration any affinities that the data may include. Further, in an exemplary embodiment, data is loaded to the server based on one or more metrics, such as resource utilization, to most effectively distribute the load within a distributed computing environment.

At the step 712, the distributed computing environment is notified that the upgrade is complete. In an exemplary embodiment, one or more health checks are performed on the upgrade domain to ascertain the upgrade domain is functional and/or healthy; therefore, the upgrade domain is viable as a source/store for data. The notification that the upgrade domain is complete may indicate that one or more services, partitions, or extents are accessible by way of the upgrade domain. Therefore, requests for the data may be routed to the upgrade domain.

Figure 8:
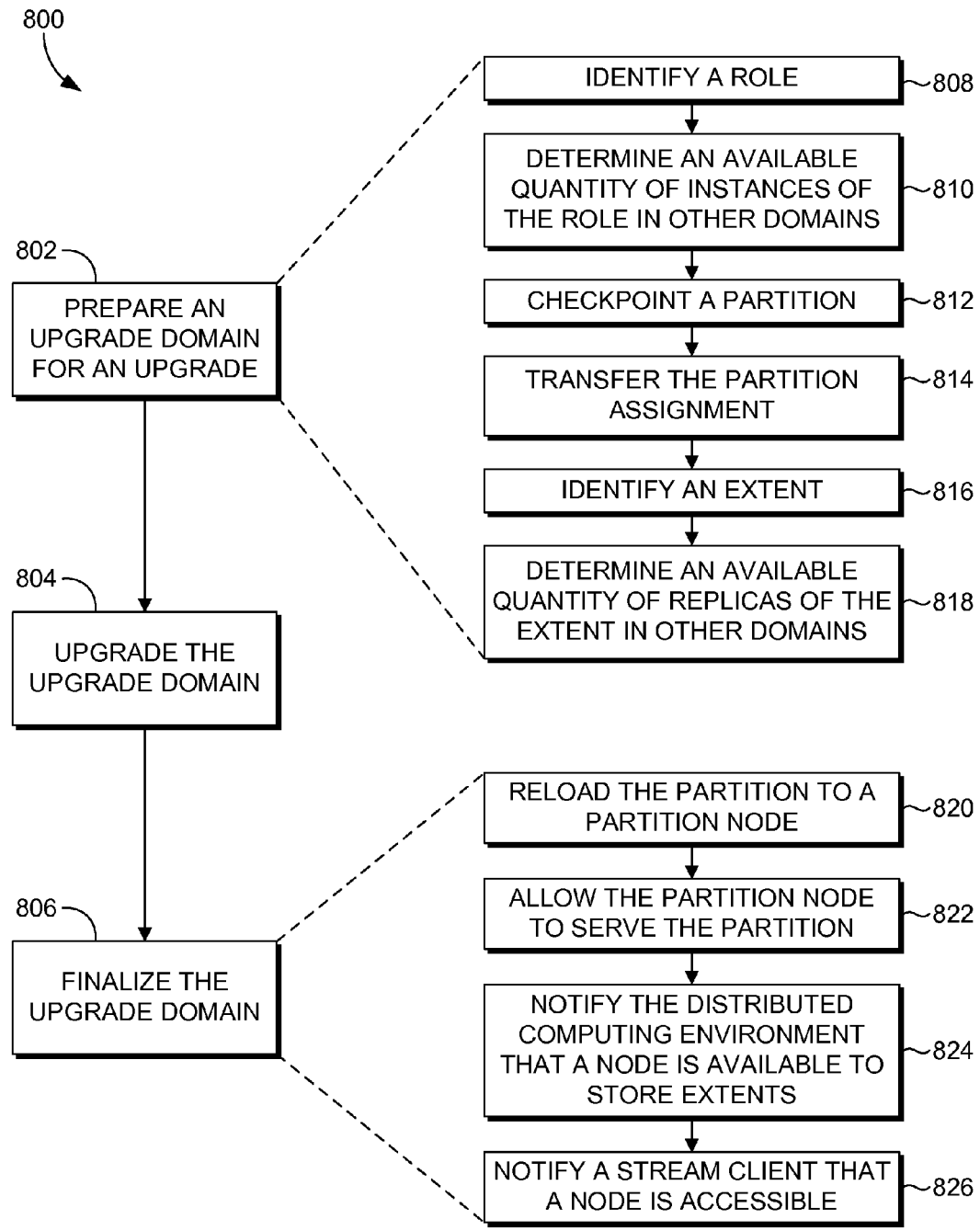
FIG. 8 depicts a method for upgrading a service in a distributed computing environment in accordance with embodiments of the present invention.

Turning to FIG. 8 that depicts a method 800 for upgrading a service in a distributed computing environment in accordance with embodiments of the present invention. The method 800 includes three overarching steps, each of which may contain additional steps. For example, the step 802 generally describes preparing an upgrade domain from an upgrade. However, a number of additional steps may further define the step 802.

The method 800 also includes a step 804. At the step 804, the upgrade domain is upgraded. Additionally, the method 800 includes a step 806. At the step 806, the upgrade domain is finalized.

The step 802 includes preparing an upgrade domain of the distributed computing environment for an upgrade. Preparing, at the step 802, includes steps 808-818. At the step 808, a role is identified. In an exemplary embodiment, the role is operating in the upgrade domain. A role operates in the upgrade domain when it is accessible from the upgrade domain. As previously discussed, an instance of the role may be located within other domains at any point. Therefore, at the step 810, an available quantity of instances of the role is determined. In an exemplary embodiment, the quantity of instances of the role is determined for domains other than the upgrade domain. This is, in part, to ensure that if all nodes of the upgrade domain were unavailable during the upgrade or unable to recover from an upgrade, then a sufficient quantity of the instances would be available at other domains.

A sufficient quantity of instance may depend on the particular instance. For example, a service defined by the role may dictate a number of instances that should be available to ensure availability and reliability. In an exemplary embodiment, the predefined threshold is dependent on the type of role. For example, a relative percentage of front-end nodes, partition nodes, and extent nodes may be required in an exemplary embodiment, For example, to ensure availability, 80% of front-end nodes, 80% of partition nodes, and 80% of extent nodes may be demanded by a service to allow an upgrade to proceed. When the predefined threshold is based on a relative percentage of available nodes, this is a non-quorum-type role. Additionally, roles that instead have a predefined absolute quantity threshold are referred to as quorum-type roles.

Examples of quorum-type roles include the previously discussed partition manager, the stream manager, and a lock server system. A quorum-type role is a role that necessitates a majority of instances to be available. In an exemplary embodiment, a quorum-type role is identified as being sufficient in quantity when there are at least a majority+1 number. Therefore, if a quorum (or quorum+1 in an additional embodiment) does not exist in domains other than the upgrade domain, the upgrade may not continue until the quorum is achieved. In an exemplary embodiment, a fabric manager is functional to cause instances of roles to be created to achieve a predefined threshold.

It is understood that a predefined threshold may be dynamically adjusted to achieve embodiment of the present invention. For example, during a downgrade (e.g., rollback) less stringent threshold demands may be required in order to get the upgrade domain back into a functional state.

Additionally, during the step 802, front-end nodes in the upgrade domain may be prevented from receiving new requests to allow the front-end nodes to complete outstanding requests. This process allows the outstanding requests to be drained from a queue, which ensures higher availability while upgrading the upgrade domain.

At the step 812, a partition in the upgrade domain is checkpointed. As previously discussed, the checkpointing of the partition ensure availability of the partition by allowing the current modified state of the partition to be captured and packed with the partition, which allows a partition role to quickly load the partition.

At the step 814, an assignment to the partition is transferred to a domain other than the upgrade domain. In an exemplary embodiment, the data comprising a partition is not moved because a partition layer is built on top of a stream layer, which therefore acts as a distributed file system. Therefore, in this example, an assignment to the partition is transferred to another domain other than the upgrade domain. In an exemplary embodiment, the partition assignment is transferred to a partition node within a domain other than the current upgrade domain (e.g., a partition role running in a different domain). Further, in an exemplary embodiment, the recipient of the transferred partition assignment begins serving request directed to the partition.

At the step 816, an extent in the upgrade domain is identified. The extent is identified so that an available quantity of replicas of the extent in domains other than the upgrade domain may be determined to be above a predefined threshold, as indicated at the step 818. When upgrading a domain, the nodes in the domain may need to be rebooted or they may be taken offline for a period of time. Therefore, it is desirable in this example to ensure that a sufficient number of replicas of the extents are available at domains other than the upgrade domain. Therefore, in this exemplary embodiment, when a sufficient number of replicas are not available, the upgrade is terminated or paused until additional replicas may be created by a stream layer. However, if a sufficient number of replicas are found to exists, the upgrade may continue. A predefined threshold of replicas may be established at two replicas or three replicas in an exemplary embodiment. However, it is contemplated that the predefined threshold may be any value to realize embodiments of the present invention.

Upon completion of the steps 808-818, an upgrade domain is prepared for an upgrade in an exemplary embodiment. As a result, the upgrade domain may then be upgraded as indicated at the step 804. The step 806 includes finalizing the upgrade domain. Finalizing the upgrade domain may include a number of sub-steps as illustrated in the method 800. The sub-steps include steps 820-826.

At the step 820, the partition is reloaded to a partition node. In an exemplary embodiment, an assignment to a partition is assigned to a partition node in order to effectuate the reloading of a partition. Further, in an exemplary embodiment, the partition is the partition that was transferred at step 814, plus any changes in the states that occurred in the interim. In an exemplary embodiment, the partition is reloaded from a checkpointed state. Therefore, the partition may be loaded quickly and efficiently. At the step 820, the partition node to which the partition is reloaded may be selected based on an affinity of the partition.

At the step 822, the partition node is allowed to serve the partition. In an exemplary embodiment, a stream manager provides authorization to the partition node or the upgrade domain to serve the partition. In an embodiment, the partition node is allowed to serve the partition as a result of the stream manager updating one or more tables in the distributed computing environment to indicate that the partition node is accessible and/or the partition is stored thereon.

At the step 824, the distributed computing environment is notified that a node is available to store extents. In an exemplary embodiment, a fabric manager provides a notification that the upgrade domain is available to store extents. This notification may be provided to the stream layer, which is typically responsible for storing extents.

At the step 826, a stream client is notified that a node is accessible for reading data. A fabric manager may notify a stream manager to provide this notification by updating of tables or other resource that a stream client would utilize to identify accessible nodes.

Additionally, as previously discussed, but not shown in FIG. 8, it is contemplated that one or more health tests may be performed at any of the steps. For example, one or more health tests may be performed at the step 802 and the step 806. Additionally, it is contemplated that at any of the steps discussed herein, if a test fails to be satisfied or a determination that a predefined threshold was not satisfied, the upgrade process may be stopped or temporally paused until a remedy may be implemented.

Figure 9:
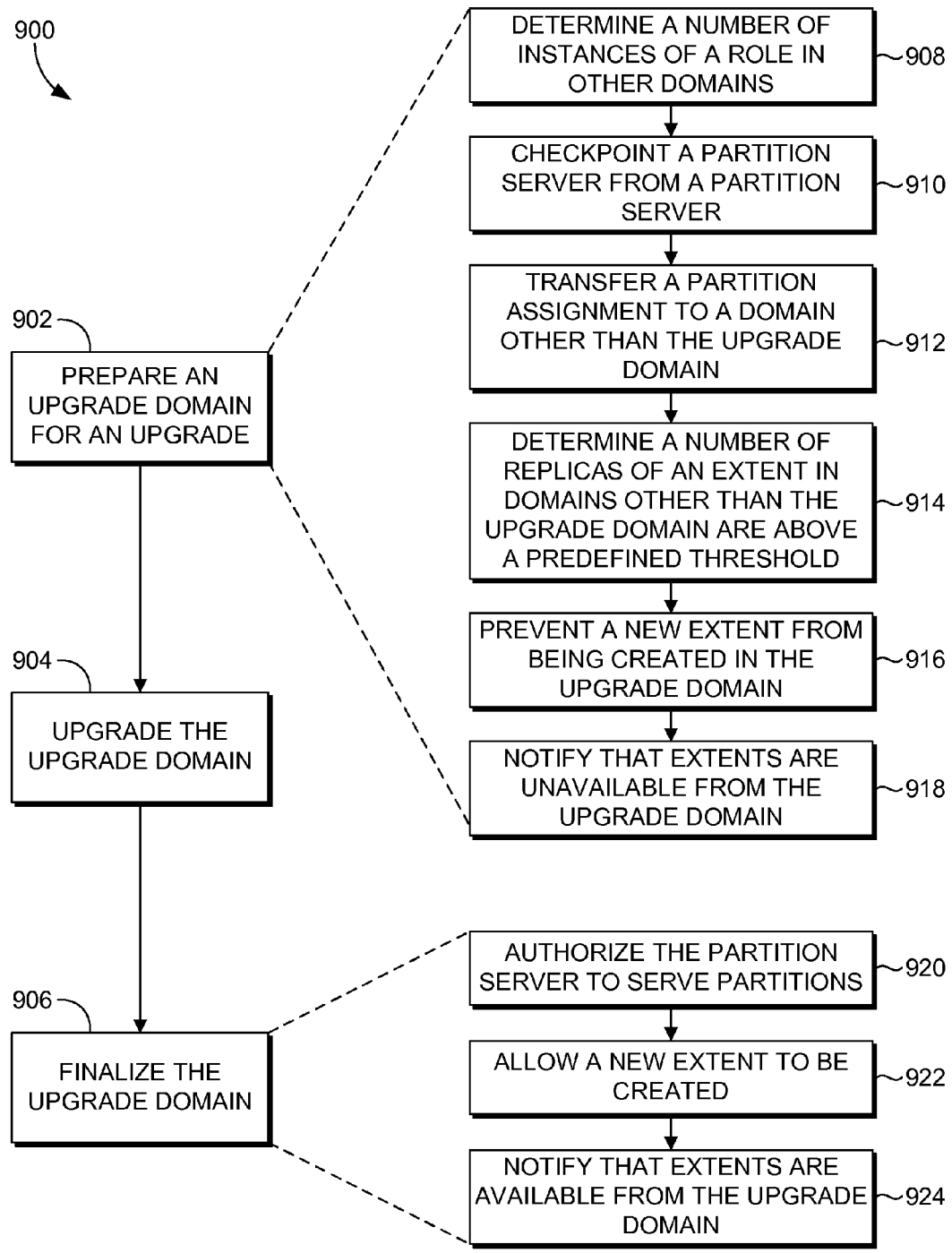
FIG. 9 depicts a method for upgrading a service in a distributed computing environment in accordance with embodiments of the present invention.

Turning to FIG. 9 that depicts a method 900 for upgrading a service in a distributed computing environment in accordance with embodiments of the present invention. The method 900 includes a step 902, a step 904, and a step 906. The steps 902-906 are similar in concept to the steps 802-806 of FIG. 8.

At the step 902 an upgrade domain that is comprised of a plurality of servers of the distributed computing environment is prepared for an upgrade. Steps 908-918 are additional steps to achieve the step 902.

At the step 908, a number of instances of a role in one or more domains other than the upgrade domain are determined to be above a predefined threshold. To the contrary, if the determination is that the predefined threshold is not achieved, the upgrade process may be suspended until it has reached the predefined threshold. In an additional embodiment, the upgrade may be terminated. In the alternative, if the predefined threshold is not achieved, additional instances may be created to meet or exceed the predefined threshold. In an exemplary embodiment, the role for which a number of instances are being evaluated is responsible for at least some functionality associated with the service that is to be upgraded.

At the step 910, a partition served from a partition server in the upgrade domain is checkpointed to facilitate faster loading upon transfer of the partition to a domain other than the upgrade domain, as indicated at the step 912. At the step 912, an assignment to the partition is transferred to the domain other than the upgrade domain. For example, a partition may be part of a partition layer which is built on top of a stream layer. In this example, the partition is not actually moved on media, but instead an assignment to the partition is reassigned to the other domain.

At the step 914, a number of replicas of an extent in one or more domains other than the upgrade domain are determined to be above a predefined threshold. In the alternative, when the number of replicas is determined to be below the predefined threshold, the upgrade process may be terminated or additional replicas are created at the stream layer. In this example, a stream manager may provide oversight to cause the replication of extents to achieve the desired number. In an exemplary embodiment, when the determined number of replicas is below a predefined threshold, the pending upgrade waits until the extent is replicated or other actions are taken to expedite the replication process.

At the step 916, a new extent is prevented from being created in the upgrade domain. As previously discussed, preventing new extents from being created may save the system resources by preventing the request for the creation of the extent from timing out or otherwise being delayed. Additionally, at the step 918, the distributed computing environment is notified that extents are unavailable from the upgrade domain. The notification may be provided by a stream manager, as previously discussed.

The steps 908-918 may be performed in any order and are not intended to be limited to the order depicted and described herein. Similarly, FIG. 7, FIG. 8, and FIG. 9 all depicts various method, none of which are intended to be limited to the order presented in an exemplary embodiment.

At the step 904 the upgrade domain is upgraded with the upgrade. As previously discussed, upgrading a domain includes upgrading a service within the domain. At the step 908 the upgrade in the upgrade domain is finalized. The method 900 includes a number of steps that define the step 906. Steps 920-924 are additional steps that may be performed to finalize an upgrade.

At the step 920, the partition server is authorized to serve one or more partitions. A fabric manager may authorize the partition servers through providing notification that the partition server is accessible and contains the partition. Therefore, authorization includes facilitating access. In an additional embodiment, authorizing includes preventing a server from serving a partition. Additionally, at the step 922, a new extent instance is allowed to be created in the upgrade domain. Similarly, the allowance may be provided by a manager in an exemplary embodiment. Also, at the step 924 the distributed computing environment is notified that one or more extents are available from the upgrade domain.

It is contemplated herein that one or more steps of a method may be implemented by a computing device to achieve automatic or semi-automatic completion of a particular step or process. Further, it is contemplated herein that a person may cause one or more steps to be implemented. For example, during an upgrade of a domain, the execution of an upgrade may be initiated with human interaction. Additionally, it is contemplated that a computing device may cause the execution of an upgrade. Therefore, embodiments of the present invention may utilize human intervention to facilitate realizing benefits of the embodiments.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and sub combinations are of utility and may be employed without reference to other features and sub combinations and are contemplated within the scope of the claims. Not all steps listed in the various figures need be carried out in the specific order described.

The invention claimed is:

1. A computer-implemented method for upgrading a service in a distributed computing environment, the method comprising:
   preparing a first domain of the distributed computing environment to receive an upgrade, wherein preparing includes:
      identifying a role operating in the first domain,
      determining that one or more instances of the role reside in a second domain,
      transferring a partition from the first domain to the second domain,
      identifying an extent in the first domain, and
      determining that one or more replicas of the extent are available in the second domain; and
   upgrading the first domain with the upgrade.

2. The method of claim 1 further comprising finalizing the upgrade of the first domain.

3. The method of claim 2, wherein finalizing the upgrade of the first domain comprises:
   reloading the partition to a partition node in the first domain; and
   allowing the partition node to serve the partition.

4. The method of claim 2, wherein finalizing the upgrade of the first domain comprises:
   notifying the distributed computing environment that a node of the first domain is available to store extents; and
   notifying a stream client in the distributed computing environment that the node and one or more associated extent instances are accessible.

5. The method of claim 2 further comprising, abstaining from upgrading the service at a domain other than the upgrade domain until the upgrade is finalized at the upgrade domain.

6. The method of claim 1 further comprising determining that an available quantity of instances of the role in the second domain is above a predefined threshold.

7. The method of claim 6, wherein the predefined threshold for the available quantity of instances of the role is a relative percentage of instances.

8. The method of claim 6, wherein the predefined threshold for the available quantity of instances of the role is a number of instances.

9. The method of claim 1, wherein preparing an upgrade domain further comprises, preventing, in anticipation of the upgrade, a front-end node of the upgrade domain from receiving a new request.

10. The method of claim 9, wherein the role operating in the upgrade domain is a software component of the service.

11. The method of claim 1 further comprising determining an available quantity of replicas of the extent in the second domain is above a predefined threshold.

12. The method of claim 11, wherein the predefined threshold for the available quantity of replicas is at least two replicas.

13. One or more computer storage media having computer-executable instructions embodied thereon, that when executed by a computing system having a processor and memory, cause the computing system to perform a method for upgrading a service in a distributed computing environment, the method comprising:
    preparing a first domain of the distributed computing environment to receive an upgrade, wherein preparing includes:
        identifying a role operating in the first domain,
        determining that one or more instances of the role reside in a second domain,
        identifying an extent in the first domain, and
        determining that one or more replicas of the extent are available in the second domain;
    upgrading the first domain with the upgrade; and
    finalizing the upgrade of the first domain.

14. The computer storage media of claim 13, wherein finalizing the upgrade of the first domain comprises:
    reloading a partition to a partition node in the first domain; and
    allowing the partition node to serve the partition.

15. The computer storage media of claim 13, wherein finalizing the upgrade of the first domain comprises:
    notifying the distributed computing environment that a node of the first domain is available to store extents; and
    notifying a stream client in the distributed computing environment that the node and one or more associated extent instances are accessible.

16. The computer storage media of claim 13 further comprising determining that an available quantity of instances of the role in the second domain is above a predefined threshold, wherein the predefined threshold is one of:
    a) a relative percentage of instances, or
    b) a number of instances.

17. The computer storage media of claim 13, wherein preparing an upgrade domain further comprises, preventing, in anticipation of the upgrade, a front-end node of the upgrade domain from receiving a new request.

18. The computer storage media of claim 13 further comprising:
    checkpointing a partition from the first node; and
    transferring the checkpointed partition to the second node.

19. The computer storage media of claim 18 further comprising:
    reloading the partition to a partition node in the first domain; and
    allowing the partition node to serve the partition.

20. One or more computer storage media having computer-executable instructions embodied thereon, that when executed by a computing system having a processor and memory, cause the computing system to perform a method for upgrading a service in a distributed computing environment, the method comprising:
    preparing a first domain comprised of a plurality of servers of the distributed computing environment for an upgrade, wherein preparing includes:
        determining that a number of instances of a role in a second domain is above a predefined threshold, wherein the role is responsible for at least some functionality associated with the service,
        transferring a partition to the second domain,
        determining that a number of replicas of an extent in the second domain is above a predefined threshold,
        preventing a new extent instance from being created in the first domain, and
        notifying the distributed computing environment that extents are unavailable from the first domain;
    upgrading the first domain with the upgrade; and
    finalizing the upgrade in the first domain, wherein the finalizing includes:
        authorizing the partition server to serve one or more partitions,
        allowing a new extent instance to be created in the first domain, and
        notifying the distributed computing environment that one or more extent instances are available from the first domain.

* * * * *